United States Patent
Rentschler et al.

(10) Patent No.: US 6,605,147 B2
(45) Date of Patent: Aug. 12, 2003

(54) USE OF SURFACE-COATED RUTILE MODIFICATION TIO₂ PIGMENTS AS AN ANTICORROSIVE WHITE PIGMENT

(75) Inventors: Thomas Rentschler, Krefeld (DE); Jochen Winkler, Rheurdt (DE)

(73) Assignee: Sachtleben Chemie GmbH, Duisburg (DE)

( * ) Notice: Subject to any disclaimer, the term of this patent is extended or adjusted under 35 U.S.C. 154(b) by 0 days.

(21) Appl. No.: 10/172,778

(22) Filed: Jun. 14, 2002

(65) Prior Publication Data

US 2003/0031785 A1 Feb. 13, 2003

(30) Foreign Application Priority Data

Jul. 18, 2001 (DE) .......................................... 101 34 272

(51) Int. Cl.⁷ .................................................. C09C 1/36
(52) U.S. Cl. ................. 106/443; 106/14.05; 106/14.12; 106/14.21; 106/436; 106/442; 106/449; 427/214; 427/215; 427/402; 427/404; 427/419.1; 427/419.2; 428/403

(58) Field of Search ............................ 106/14.05, 14.12, 106/14.21, 436, 442, 443, 449; 427/214, 215, 402, 404, 419.1, 419.2; 428/403

(56) References Cited

FOREIGN PATENT DOCUMENTS

| DE | WO099/65994 | * | 12/1999 |
| DE | WO00/11089 | * | 3/2000 |

* cited by examiner

Primary Examiner—C. Melissa Koslow
Assistant Examiner—Shalie Manlove
(74) Attorney, Agent, or Firm—Fulbright & Jaworski L.L.P.

(57) ABSTRACT

The use of surface-coated rutile modification TiO₂ pigments having a primary particle grain size $d_{50}$ of 0.1 to 1.0 μm as an anticorrosive white pigment, with firstly magnesium phosphate and secondly aluminum oxides and/or aluminum hydroxides being precipitated onto the TiO₂ pigments, is described.

10 Claims, No Drawings

USE OF SURFACE-COATED RUTILE MODIFICATION TiO₂ PIGMENTS AS AN ANTICORROSIVE WHITE PIGMENT

The invention relates to the use of surface-coated rutile modification $TiO_2$ pigments as an anticorrosive white pigment.

$TiO_2$ pigments that have a grain size $d_{50}$ of 0.1 to 1.0 µm are used to lighten dark media and in order to lend covering power to coating materials. The more the light refracting of the pigments is superior to the light refracting of the binding agent, the better suited for this are the $TiO_2$ pigments. Coating properties are influenced by the incorporated $TiO_2$ pigments. This behaviour, in terms of application techniques, is already adjusted during the production of the $TiO_2$ pigments. This relates not only to the optical properties, such as scattering power, brightness and lustre, but also to further parameters, such as weather resistance, dispersability, settling behaviour and wettability.

The increasing importance of corrosion prevention and the recognition of the health risks originating from known anticorrosive pigments which contain lead and chromate have led to the development of less toxicologically harmful anticorrosive pigments based on phosphates, in particular $Zn_3(PO_4)_2$, as well as molybdate pigments, tungstate pigments and zirconate pigments, metallic zinc, organic pigments and pure barrier pigments, such as micaceous iron ore.

$TiO_2$ pigments having a corrosion-inhibiting action, the particles of which are sheathed with an outer layer of hydrated silicon dioxide, hydrated aluminium oxide or a mixture of these two components, are the subject matter of EP 0412686 B. Cations, consisting of Ca ions, Zn ions, Li ions, Ba ions, Mg ions, Sr ions, Co ions or Pb ions, which effect corrosion prevention by means of ion exchange, are chemically bonded to the coating. EP 0595341 A refers to a coating material which contains $TiO_2$ pigments which are coated with 1 to 10% by weight of a zinc alloy and are used for corrosion prevention. CZ-B-235 851 proposes inter alia $TiO_2$ pigments which are coated with a layer of $Mn_3(PO_4)_2$ and mixed with varnishes for the purposes of corrosion prevention. CZ-B 235 887 discloses a $TiO_2$ base body which is coated firstly with Zn phosphate, secondly with Ca phosphate and/or Mg phosphate and thirdly with Mn phosphate and/or Al phosphate, and is used for the purposes of corrosion prevention.

Finally, the use of a surface-coated $TiO_2$ base body, preferably in the rutile modification and having a grain size of 0.1 to 1.0 µm, as an anticorrosive white pigment, with firstly manganese phosphate and secondly aluminium oxides and/or aluminium hydroxides being precipitated onto the $TiO_2$ base bodies, is described in WO 99/65994. The disadvantage in this connection is the yellow cast of these anticorrosive white pigments.

An object of the present invention is to overcome the disadvantages of the prior art and in particular to make available anticorrosive white pigments that have no yellow cast and at the same time have at least the same or a greater anticorrosive effect than previously known anticorrosive white pigments.

This object is achieved by means of the use of surface-coated rutile modification $TiO_2$ pigments having a grain size $d_{50}$ of the primary particles of 0.1 to 1.0 µm as an anticorrosive white pigment, with firstly magnesium phosphate and secondly aluminium oxides and/or aluminium hydroxides being precipitated onto the $TiO_2$ pigments.

It is of advantage that a greater anticorrosive effect is achieved in comparison with the anticorrosive white pigments described in CZ-B-235 887 and in WO 99/65994, without the anticorrosive white pigments having a yellow cast.

In a further development of the invention, magnesium phosphate is partially replaced by zinc phosphate.

The substances precipitated onto the $TiO_2$ pigments are preferably precipitated in the following proportions in relation to the quantity of $TiO_2$ used (data in % by weight):

| | |
|---|---|
| magnesium phosphate | 0.5 to 30 |
| Al-hydroxides and/or Al-oxides (calculated as $Al_2O_3$) | 1 to 10 |
| zinc phosphate | 0 to 30. |

It is particularly preferred that the substances precipitated onto the $TiO_2$ pigments are precipitated in the following proportions in relation to the quantity of $TiO_2$ used (data in % by weight):

| | |
|---|---|
| magnesium phosphate | 1 to 15 |
| Al-hydroxides and/or Al-oxides (calculated as $Al_2O_3$) | 1 to 5 |
| zinc phosphate | 0 to 30. |

A method for preparing the surface-coated pigments that are to be used in accordance with the invention can be carried out as follows:

A suspension is prepared from rutile modification $TiO_2$ having a primary particle grain size $d_{50}$ of 0.1 to 1.0 µm, and water. The suspension preferably contains 200 to 350 g $TiO_2$ per liter of suspension. The suspension is raised to a preferred temperature of 60 to 90° C. whilst being stirred. The pH-value of the suspension is preferably adjusted to a value of 6 to 7.5. An alkali hydroxide or a mineral acid, preferably sulphuric acid, can be used to adjust the pH-value.

One or more solutions containing $Mg^{2+}$ and one or more solutions containing phosphate ions, preferably phosphoric acid, are added to the $TiO_2$-suspension. Magnesium phosphate is thereby precipitated onto the $TiO_2$-particles. The pH-value in this precipitation reaction is preferably adjusted to values between 6 and 7.5. Subsequently, one or more solutions containing $Al^{3+}$ are added, with the pH-value preferably being adjusted to values between 6 and 7.5. Aluminium oxides and/or aluminium hydroxides are thereby precipitated onto the $TiO_2$-particles.

The suspension that is obtained is preferably stirred further for 1 to 5 hours (preferred temperature 60 to 90° C.) and the $TiO_2$ pigments that are provided with a layer of firstly magnesium phosphate and secondly aluminium oxide and/or aluminium hydroxide are filtered off in the usual way, dried and, if applicable, ground.

The pigments thus obtained can be used as anticorrosive white pigments. Examples of such applications are the automobile sector (electro-dip coatings), household appliances and the field of industrial varnishes. The latter includes the use of the pigments in primers, band coatings (coil and can coatings), single-layer varnish coatings (for example for the DIY market) and electro-dip coatings.

The subject matter of the invention is explained in greater detail with the aid of the following examples:

EXAMPLE 1

An aqueous $TiO_2$-suspension of 13.3 l, containing 300 g $TiO_2$/l having an average particle size $d_{50}$ of 0.35 μm, was heated to a temperature of 80° C. with constant stirring. The pH-value was adjusted and kept constant during the precipitation reaction, as required, by means of NaOH or $H_2SO_4$.

The first component, Mg, as an aqueous $MgSO_4$-solution, was added to the $TiO_2$-solution whilst stirring. The addition of 1422 ml of this solution, with 45 g of Mg/l, was effected at a pH-value of 7, which was maintained with 20% NaOH. Afterwards, 630 ml of a phosphoric acid solution containing 200 g of $P_2O_5$/l was added thereto in metered doses in order to bring about the precipitation of magnesium phosphate. The pH-value of 7 was again adjusted with NaOH at the same time. Subsequently, the simultaneous addition of 137 ml of an $NaAlO_2$-solution containing 282 g/l as well as of 280 ml of an $Al_2(SO_4)_3$-solution containing 69 g/l at a pH-value of 6.5, kept constant with NaOH, took place. During the precipitation reaction, the temperature was maintained at 80° C.

After a maturing time of 2 hours with constant stirring at 80° C. and a pH-value of 6.5 the resulting product was filtered off, washed with 6 liters of demineralized water/kg product, dried at 110° C. and subsequently ground in a steam-jet mill.

Comparison Example A

According to WO 99/65994

An aqueous $TiO_2$-solution of 15.0 l, containing 273.3 g $TiO_2$/l having an average particle size $d_{50}$ of 0.35 μm, was heated to a temperature of 80° C. whilst being constantly stirred. The pH-value was adjusted and kept constant during the precipitation reaction, as required, by means of NaOH or $H_2SO_4$.

Whilst stirring, an aqueous $MnSO_4$-solution was added to the $TiO_2$-suspension. The addition of 1253 ml of this solution with 45 g Mn/l solution was effected at a pH-value of 6.7, which was maintained with 20% NaOH. Afterwards, 246 ml of a phosphoric acid solution containing 200 g of $P_2O_5$/l solution was added thereto in metered doses in order to bring about the precipitation of manganese phosphate. The pH-value of 6.7 was adjusted again with NaOH at the same time. Subsequently, the simultaneous addition of 184 ml of an $NaAlO_2$-solution containing 222 g/l as well as of 259 ml of an $Al_2(SO_4)_3$-solution containing 79 g/l at a pH value of 7.0, kept constant with NaOH, took place. During the precipitation reaction, the temperature was maintained at 80° C.

After a maturing time of 2 hours with constant stirring at 80° C. and a pH value of 7.0 the resulting product was filtered off, washed with 6 liters of demineralized water/kg product, dried at 110° C. and subsequently ground in a steam-jet mill.

EXAMPLE 3

Comparison of the Properties of the Coated $TiO_2$ Pigments from Example 1 and Comparison Example A The coated $TiO_2$ pigment produced according to Example 1 was compared with the coated $TiO_2$ pigment from Comparison Example A (see Table 1).

TABLE 1

Analytical and physical data of the coated $TiO_2$ pigments

|  | Example 1 | Comparison Example A |
|---|---|---|
| % rutile | 99.9 | 99.6 |
| % $TiO_2$ | 93.4 | 94.2 |
| % Mg | 0.6 | — |
| % $P_2O_5$ | 3.0 | 1.9 |
| % Mn | — | 1.1 |
| % $Al_2O_3$ | 1.6 | 1.8 |
| CBU | 11.9 | 10.6 |
| Srel | 107 | 104 |
| L* | 97.55 | 96.0 |
| a* | −0.29 | 0.06 |
| b* | 2.9 | 4.1 |
| % yellow cast | 5.1 | 7.7 |
| $d_{50}$ particle size (μm) | 0.36 | 0.39 |
| B90/10 particle size distribution (μm) | 0.26 | 0.29 |
| BET specific area (m²/g) | 11.2 | 10 |
| pH-value | 8.6 | 8 |
| electrical conductivity (μS/cm) | 268 | 150 |

Differences between the two pigments that are compared in Table 1 are a result of the different chemical composition of the surface-coating components Mg or Mn respectively. Particle sizes and the distribution ranges thereof, specific areas and pH-values are practically identical. The sample containing magnesium phosphate according to Example 1 has a greater electrical conductivity. This points to a higher solubility of the components on the surface. As a result, a higher level of chemical activity of the anticorrosive substances is achieved.

The two samples have, to some extent, significant differences in the optical data. In fact, the light-scattering properties of the two samples are at a comparable level, that is, the scattering power and the CBU value, which is regarded as a measure of the fine-divisibility in pigmented pastes, are only a little higher in the case of the sample containing Mg according to Example 1, this being accompanied by slightly improved properties with respect to the comparison sample A. However, the light-absorption properties of the samples are marked by greater differences. The brightness L* is clearly higher in the case of the pigment containing Mg according to Example 1, and the yellow cast, also the corresponding calorimetric measure b*, are substantially lower in the case of the pigment containing Mg, this being a direct consequence of the different surface coatings of the two samples. Whilst the manganese phosphate coating has a noticeable yellow cast of the white powder, this is not the case with the magnesium phosphate coating.

EXAMPLE 4

Salt Spray Test

The two $TiO_2$-anticorrosive pigments (from Example 1 and Comparison Example A) were incorporated into a solvent-containing, alkyd resin based binder system (Alftalat AM 380) with a pigment volume concentration (PVC) of 7%. The varnishes spin coated, with a dry layer thickness of 30 μm, onto degreased, non sand-blasted steel plates. Three scratched and three non-scratched plates from each sample were, in each case, subjected to the salt-spray test according to DIN 53167. The evaluation of the blistering was carried out according to DIN 53209 on a scale of 0 to 5, with the number of blisters m being indicated as 0=none to 5=very many, or, the blister size g being indicated as 0=none to 5=very large.

After 330 hours of the salt-spray test, a considerable number of blisters were visible on the comparison sample (varnish with pigment containing Mn), this corresponding to an m of 4. The size of the blisters was evaluated with g=3. The quantity and size of the blisters were evaluated for the sample in accordance with the invention (varnish with pigment containing Mg) with m=1 to 2 and g=2. After removal of the coating, the steel plate lying underneath was totally clean and uncorroded in the case of the coating in accordance with the invention, whilst pimples of rust, distributed all over, could be noted on the steel plate with the comparison coating.

What is claimed is:

1. A method of producing anti-corrosive surface-coated rutile modified $TiO_2$ pigments comprising:

precipitating a first coating comprising magnesium phosphate onto a surface of a $TiO_2$ pigment having a primary particle grain size $d_{50}$ of 0.1 to 1.0 $\mu$m to yield a magnesium coated $TiO_2$ pigment; and subsequently precipitating at least one aluminum compound selected from the group consisting of aluminum oxide and aluminum hydroxide onto the magnesium coated $TiO_2$ pigment to form a second coating thereon.

2. The method of claim 1, further comprising precipitating zinc phosphate onto said $TiO_2$ pigments.

3. The method of claim 1, wherein the substances precipitated onto the $TiO_2$ pigments are precipitated in the following proportions in relation to the quantity of $TiO_2$ used (data in % by weight):

| | |
|---|---|
| magnesium phosphate | 0.5 to 30 |
| Al-hydroxides and/or Al-oxides (calculated as $Al_2O_3$) | 1 to 10 |
| zinc phosphate | 0 to 30. |

4. The method of claim 3, wherein the substances precipitated onto the $TiO_2$ pigments are precipitated in the following proportions in relation to the quantity of $TiO_2$ used (data in % by weight):

| | |
|---|---|
| magnesium phosphate | 1 to 15 |
| Al-hydroxides and/or Al-oxides (calculated as $Al_2O_3$) | 1 to 5 |
| zinc phosphate | 0 to 10. |

5. The method of claim 2, wherein the substances precipitated onto the $TiO_2$ pigments are precipitated in the following proportions in relation to the quantity of $TiO_2$ used (data in % by weight):

| | |
|---|---|
| magnesium phosphate | 0.5 to 30 |
| Al-hydroxides and/or Al-oxides (calculated as $Al_2O_3$) | 1 to 10 |
| zinc phosphate | 0 to 30. |

6. A method of coating a substrate comprising applying a coating comprising the $TiO_2$ pigments prepared according to the process of claim 1 to a substrate.

7. A method of coating a substrate comprising applying a coating comprising the $TiO_2$ pigments prepared according to the process of claim 2 to a substrate.

8. A method of coating a substrate comprising applying a coating comprising the $TiO_2$ pigments prepared according to the process of claim 3 to a substrate.

9. A method of coating a substrate comprising applying a coating comprising the $TiO_2$ pigments prepared according to the process of claim 4 to a substrate.

10. A method of coating a substrate comprising applying a coating comprising the $TiO_2$ pigments prepared according to the process of claim 5 to a substrate.

* * * * *